United States Patent [19]
Janning

[11] 3,799,651
[45] Mar. 26, 1974

[54] LIQUID CRYSTAL DISPLAY CELL AND METHOD OF MAKING SAME

[75] Inventor: John L. Janning, Dayton, Ohio

[73] Assignee: The National Cash Register Company, Dayton, Ohio

[22] Filed: June 1, 1972

[21] Appl. No.: 258,910

[52] U.S. Cl.......... 350/160 LC, 29/400 C, 53/22 A, 141/1
[51] Int. Cl. ............................................ G02f 1/16
[58] Field of Search .................. 350/160 LC; 141/1; 53/22 A; 29/400 C

[56] References Cited
UNITED STATES PATENTS
3,701,368   10/1972   Stern...................................... 141/1

Primary Examiner—Edward S. Bauer
Attorney, Agent, or Firm—J. T. Cavender; Lawrence P. Benjamin

[57] ABSTRACT

A liquid crystal display cell having a channel formed in one of the glass plates of the cell is disclosed. The channel facilitates the filling of the cell with a liquid crystal material. The other glass plate of the cell contains an aperture through which the cell is filled. The aperture is opposite a portion of the channel.

10 Claims, 13 Drawing Figures

3,799,651

FIG. 1A FORM CONTAINER

FIG. 2A PLACE LIQUID CRYSTAL MATERIAL IN FILLING TUBE

FIG. 3A PUMP CONTAINER

FIG. 4A CLOSE TUBE

FIG. 5A HEAT CONTAINER

FIG. 6A COMPLETED DISPLAY CELL

PATENTED MAR 26 1974 3,799,651

LIQUID CRYSTAL DISPLAY CELL AND METHOD OF MAKING SAME

BACKGROUND OF THE INVENTION:

M. J. Freiser in U.S. Pat. No. 3,625,591 issued Dec. 7, 1971 disclosed a method of forming a liquid crystal display cell. Liquid crystal material is placed on a first glass panel. A second glass panel is placed on the first glass panel and the edges thereof are sealed with molten glass beads to form a liquid crystal display cell which has liquid crystal material therein.

In the present invention a liquid crystal display cell is formed which has a filling tube attached thereto and a filling channel within said cell. The liquid crystal material is evenly distributed in the liquid crystal display cell after formation thereof, due to the use of the filling tube to hold liquid crystal material therein prior to evacuation of air from the liquid crystal display cell. After evacuation the filling tube is closed. The uniform filling of the liquid crystal display cell through the filling channel is accomplished by heating the liquid crystal display cell after it is so closed. The use of a filling tube allows for an improved liquid crystal display cell to be formed.

The prior art does not show a liquid crystal display cell having a filling tube and an adjacent filling channel therein.

SUMMARY OF THE INVENTION

The present invention relates to a liquid crystal display cell comprising a closed container having a filling tube means connected to said closed container adjacent to a filling channel in said closed container for filling said closed container with a liquid crystal material.

An object of the present invention is to provide a liquid crystal display cell which has a filling tube and an adjacent filling channel therein for filling the liquid crystal display cell.

Another object of the present invention is to provide a method of filling a liquid crystal display cell by means of a filling tube connected thereto.

DESCRIPTION OF THE DRAWINGS

FIGS. 1A through 6A show descriptive steps for fabricating the liquid crystal display cell of the present invention.

FIGS. 1B through 6B are sectional views of fabrication states of the liquid crystal display cell of the present invention.

DESCRIPTION OF THE PREFERRED EMBODIMENT

Figure 1B:
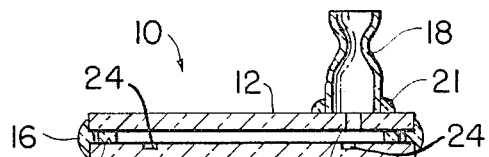

As shown in FIG. 1B a liquid crystal display cell 10 is formed. The liquid crystal display cell 10 has a first panel 12 and a second panel 14 held in precise parallel relationship by a divider 15. The distance between the glass plates 12 and 14 is approximately 0.0003 inches. A glass frit 16 acts as a seal between the glass plates 12 and 14. A filling hole 17 is formed in one of the glass plates such as glass plate 12, as by sandblasting the filling hole 17. One end of a filling tube 18 is placed in contact with the glass plate 12 and around the filling hole 17. A filling channel 24 is formed in the glass plate 14 adjacent the filling hole 17. The filling channel 24 has a depth of approximately 0.003 inches into the glass plate 14. The channel 24 is interrupted in one place in order to permit electrical connection to be made from the outer edge of the cell 10 to a portion of a transparent conductor which is disposed on the plate 14 within the area defined by the channel 24, as is shown more clearly in FIG. 7. The filling channel 24 enables better filling of the liquid crystal display cell 10. A glass frit 21 is placed around the junction of the filling tube 18 and the glass plate 12. The liquid crystal display cell 10 is placed in an oven and heated to about 450° C for about one half hour to form hermetic seals from the glass frit 16 and 21. After the liquid crystal cell assembly 10 is cooled, the filling tube 18 is rigidly connected to the glass plate 12.

Figure 2B:
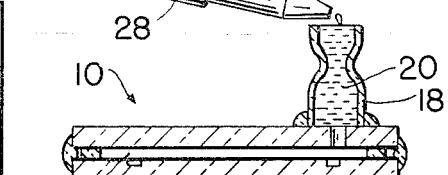

As shown in FIG. 2B, the filling tube 18 has a sufficient length to accommodate a volume of liquid crystal material 20 which will completely fill the space between the glass plates 12 and 14. The liquid material 20 may be a nematic liquid crystal material such as p-Methoxy-Benzylidine-p-n-Butyl-Anniline (MBBA) which is doped with an electrically conductive impurity. The liquid crystal material 20 is placed within the filling tube 18 of the liquid crystal display cell 10 as by an eye dropper 28. The liquid crystal material 20 does not completely fill the space between the glass plates 12 and 14 due to air 22 trapped by the liquid crystal material 20 in the liquid crystal display cell 10.

Figure 3B:
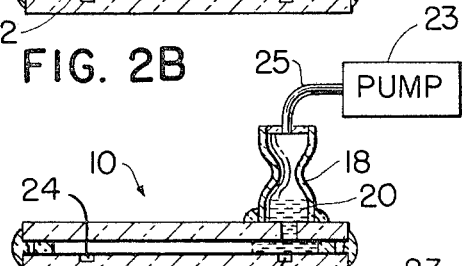

As shown in FIG. 3B, the air 22 is pumped to a pressure of approximately 10 micro Torr for several hours by means of a pump 23 through a hose 25. The removal of most of the air 22 allows the liquid crystal material 20 to further fill the space between the glass plates 12 and 14 through the filling channel 24. However, the liquid crystal material remains in the liquid crystal display cell 10 during pumping due to gravity and the fact that it remains in a liquid state. The liquid crystal material 20 still does not completely fill the space between the glass plates 12 and 14. The pumping could be done while baking the liquid crystal display cell to get even more air 22 out of it.

Figure 4B:
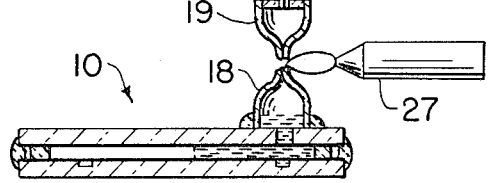

As shown in FIG. 4B the liquid crystal container 10 is hermetically sealed by closing filling tube 18 with a torch 27 while it is under a vacuum from vacuum pump 23. The portion 19 of the filling tube 18 is removed from the closed filling tube 18. Substantially all of the air 22 is thus removed from liquid crystal container 10.

Figure 5B:
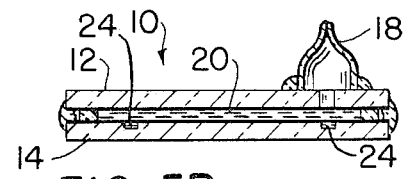

As shown in FIG. 5B, the liquid crystal display cell 10 is slowly heated to approximately 215° C and held at this temperature for approximately 12 hours to vaporize the liquid crystal material 20 and have it recondense to evenly distribute the liquid crystal material 20 throughout the space between the glass plates 12 and 14 through the filling channel 24. The liquid crystal material 20 is substantially free of atmospheric contamination since it is in the hermetically sealed liquid crystal display cell 10 having the closed filling tube 18. Since air has been removed from the liquid crystal display cell 10, and the liquid crystal material 20 is evenly distributed, its operating parameters are more certain and able to be duplicated than can be obtained by prior art techniques. A shorter heating time than approximately 12 hours and a lower temperature than approximately 215° C may be used if the liquid crystal display cell 10 is ultrasonically agitated during the liquid crystal distribution step.

Figure 6B:
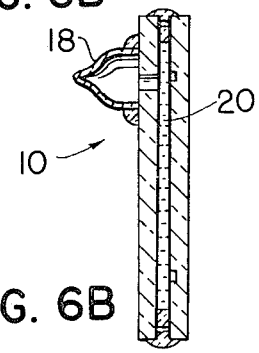

FIG. 6B shows a completed liquid crystal display cell 10. The closed filling tube 18 extends a short distance from the glass plate 12 of the liquid crystal display cell 10. The liquid crystal material 20 therefor is protected from air and is evenly distributed within the cell.

Figure 7:
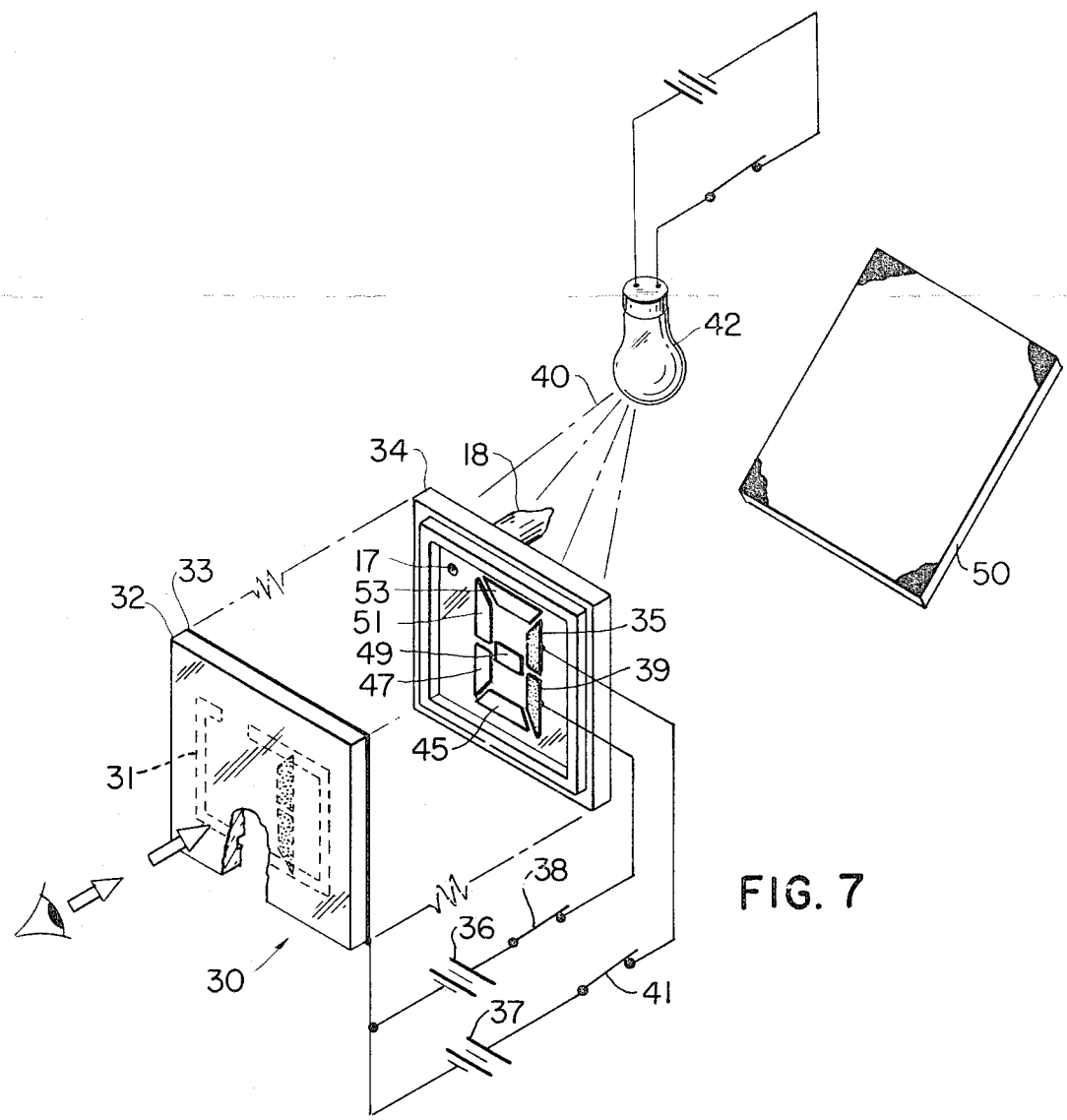
FIG. 7 is a perspective view of the operation of the liquid crystal display cell of the present invention.

A liquid crystal display cell 30 which has a filling channel 31 and a filling tube 18 therein is shown in FIG. 7. The filling channel 31 is formed in a glass plate 32, and begins at a point adjacent filling hole 17 in glass plate 34. A first transparent common electrode 33 is first formed on the glass plate 32 and the filling channel 31 is then formed. To allow electrical conduction to the center portion of the transparent electrode 33 the filling channel 31 does not make a closed loop. Transparent electrodes 35, 39, 45, 47, 49, 51 and 53 are formed on the glass plate 34, and are connected through switches such as switches 38 and 41 to a single power source or to individual power sources such as the batteries 36 and 37. In order to avoid undue complexity of circuitry shown in FIG. 7, this circuitry is shown only for electrodes 35 and 39, but it will be recognized that similar circuitry is employed for all of the other electrodes.

A lamp 42 is used to emit light 40 which can be scattered by nematic liquid crystal material between selectively charged electrodes on glass plate 34 and the common electrode 33. A black screen 50 prevents distracting light from coming through display cell 30 from points behind lamp 42.

An image of a numeral "one", for example, is formed by the light 40 scattered by the liquid crystal material between the transparent common electrodes 33 and the transparent electrodes 35 and 39 when switches 38 and 41 are closed. The image of the numeral "one" is sharp and clear due to the construction and method of filling the liquid crystal display cell 30. The unenergized transparent electrodes 45, 47, 49, 51 and 53 will not cause light to be scattered by the liquid crystal material in contact therewith since no voltage is applied to them in the illustrated example. The black background of the screen 50 is thus seen through all portions of the cell 30 except for the "one" formed by electrodes 35 and 39 which is brightly illuminated by the reflected light from the lamp 42, and thus stands out in contrast to the dark background.

When switches 38 and 41 are opened, the image of a "one" will persist for a period of approximately 200 milliseconds due to the purity and therefore the high electrical resistivity of the liquid crystal material therein. The liquid crystal material is relatively pure due to the fact that substantially no air is contained therein.

What is claimed is:
1. A liquid crystal display cell comprising:
   a. a first panel having first and second surfaces;
   b. a second panel, having first and second surfaces, parallel to the first panel and spaced therefrom, the first surface of the first panel facing the first surface of the second panel;
   c. a filler channel disposed within the first surface of the second panel, the filler channel extending into the second panel by a distance greater than the spacing between the panels and being in the form of a substantially closed loop adjacent the edges of the second panel;
   d. sealer means disposed about the edges of and between the first and second panels;
   e. an aperture disposed within the first panel extending between and through the first and second surfaces thereof and positioned adjacent a portion of the filler channel; and
   f. a hollow filler tube connected to the second surface of the first panel in alignment with the aperture, the filler channel and the region between the first and second panels defining a volume for holding liquid crystal material.

2. The liquid crystal display cell of claim 1 further comprising a first transparent electrode film disposed on the first surface of the first panel; and
   a second transparent electrode film disposed on the first surface of the second panel.

3. The liquid crystal display cell of claim 2, further comprising liquid crystal material disposed within the volume.

4. The liquid crystal display cell of claim 3 wherein the liquid crystal material is a nematic liquid crystal material.

5. The liquid crystal display cell of claim 1 wherein the hollow filling tube is glass.

6. The liquid crystal display cell of claim 1 wherein the first and second panels are glass.

7. A method of manufacturing a liquid crystal display cell, comprising:
   a. forming a closed container of first and second spaced, parallel panels being sealed about the edges, the second panel having a filler channel extending into its interior surface by a distance greater than the spacing between the panels, the filler channel being in the form of a substantially closed loop adjacent the edges of the second panel;
   b. connecting a filler tube to the outer surface of the first panel of the closed container in registry with both a filler aperture extending through the first panel and with the filler channel;
   c. placing liquid crystal material in said filler tube;
   d. pumping the interior of the closed container and filler tube to substantially free the container of gas;
   e. sealing the filler tube while the closed container is under vacuum; and
   f. heating the filled closed container to evenly distribute the liquid crystal material through the body of the closed container from the filler tube.

8. The method of claim 7 wherein the interior of the closed container is pumped to a pressure of approximately 10 micro Torr.

9. The method of claim 7 wherein the closed container is heated to approximately 215° C. for approximately 12 hours to cause the liquid crystal material to be evenly redistributed through the body of said closed container from the filler tube.

10. The method of claim 7 wherein the closed container is ultrasonically vibrated while it is being heated to cause the liquid crystal material to be evenly redistributed through the body of said closed container from the filler tube.

* * * * *